July 6, 1926. 1,591,915
P. T. LINDHARD
APPARATUS FOR AGITATING SLURRY, ETC
Filed August 4, 1924 4 Sheets-Sheet 1
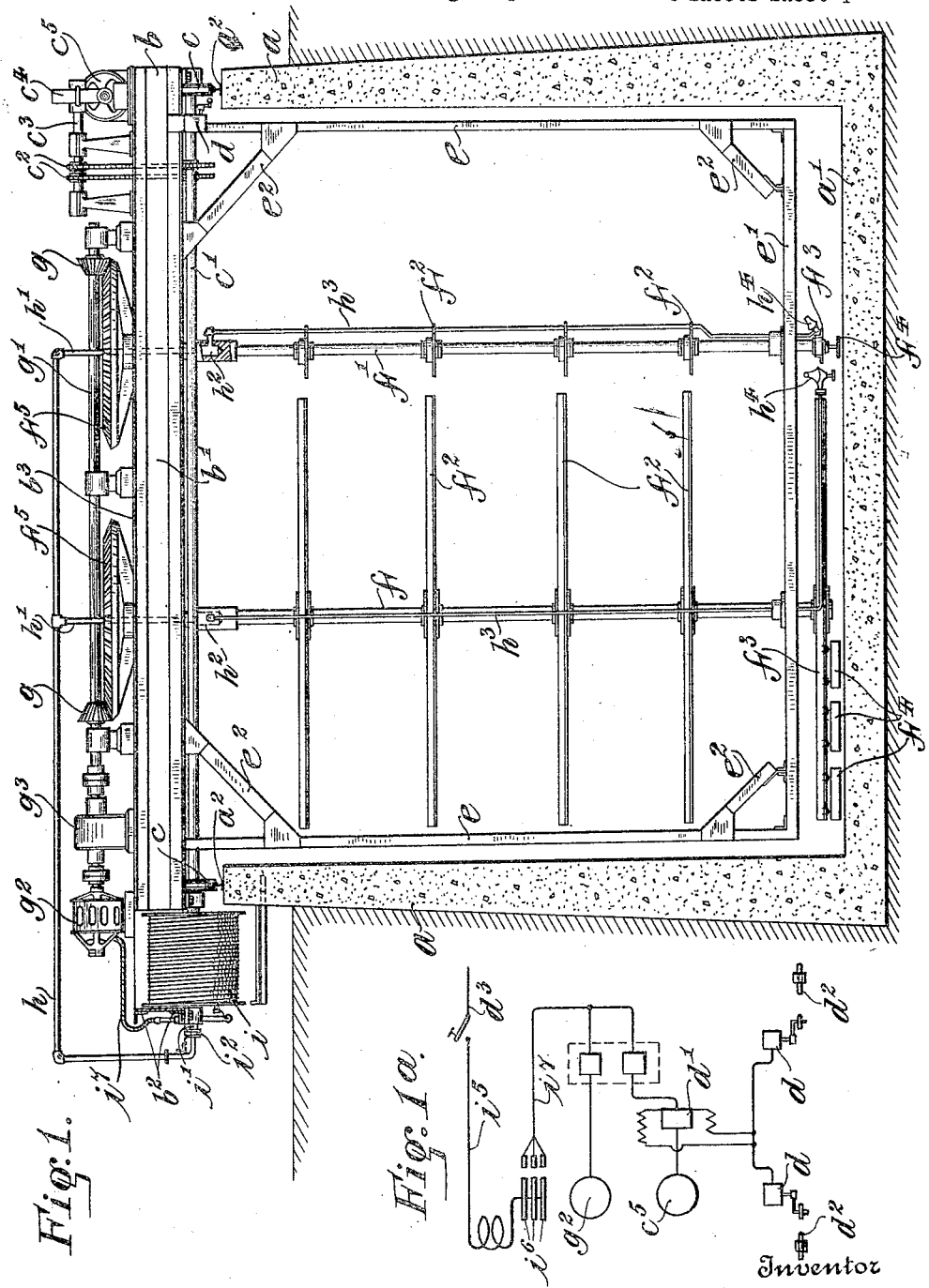
Inventor
Povl T. Lindhard
By his Attorneys
Redding, Greeley, O'Shea Campbell July 6, 1926. 1,591,915
P. T. LINDHARD
APPARATUS FOR AGITATING SLURRY, ETC
Filed August 4, 1924 4 Sheets-Sheet 2
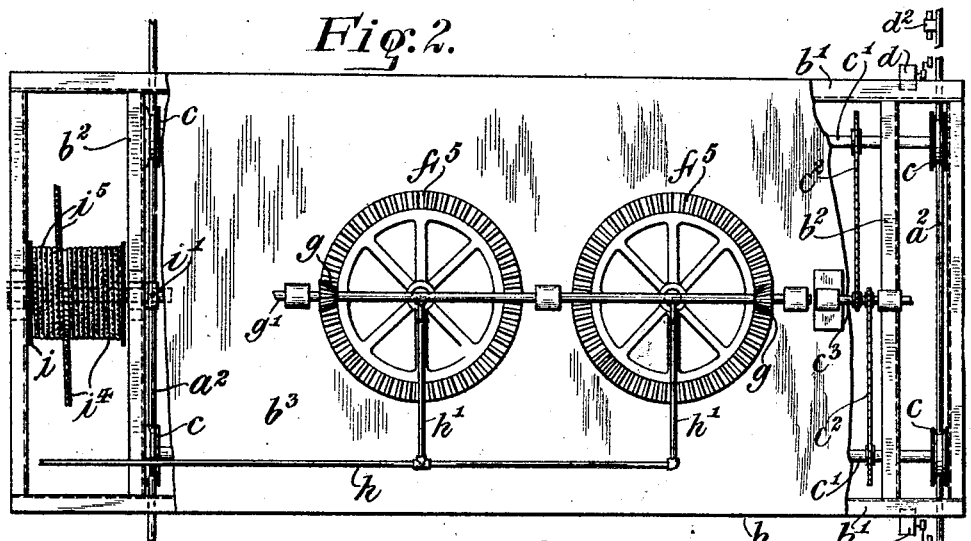
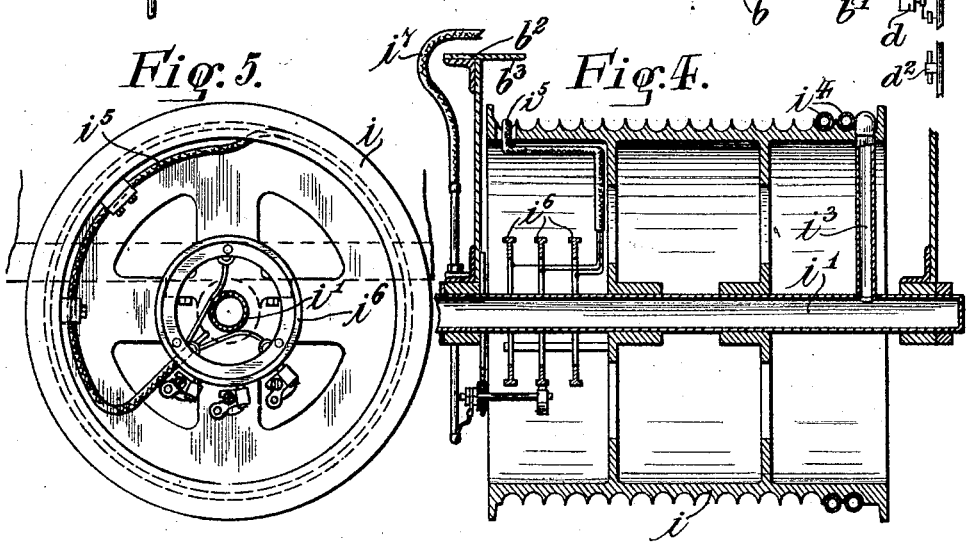
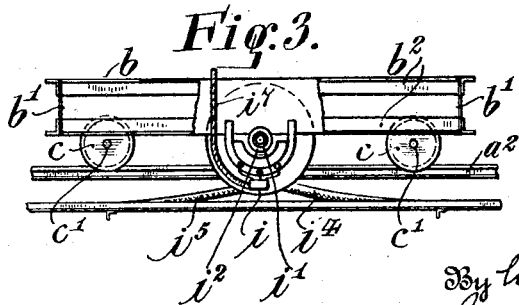
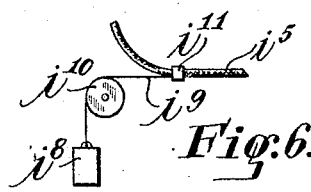
Inventor
Povl T. Lindhard
By his Attorneys
Redding, Greeley, O'Shea Campbell July 6, 1926.
P. T. LINDHARD
1,591,915
APPARATUS FOR AGITATING SLURRY, ETC
Filed August 4, 1924     4 Sheets-Sheet 3
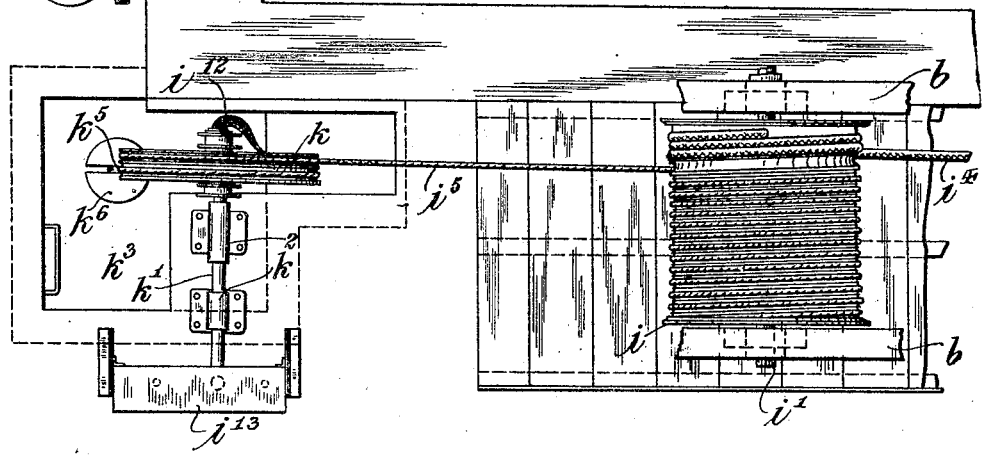
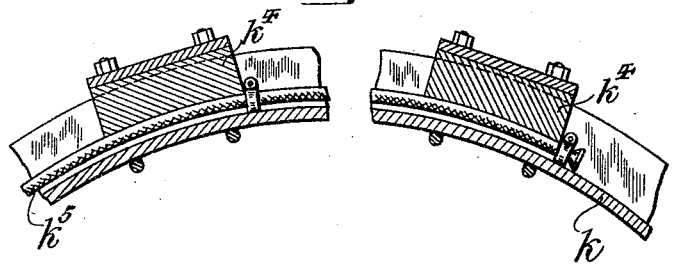
Inventor
Poul T. Lindhard
By his Attorneys
Redding, Greeley, O'Shea Campbell

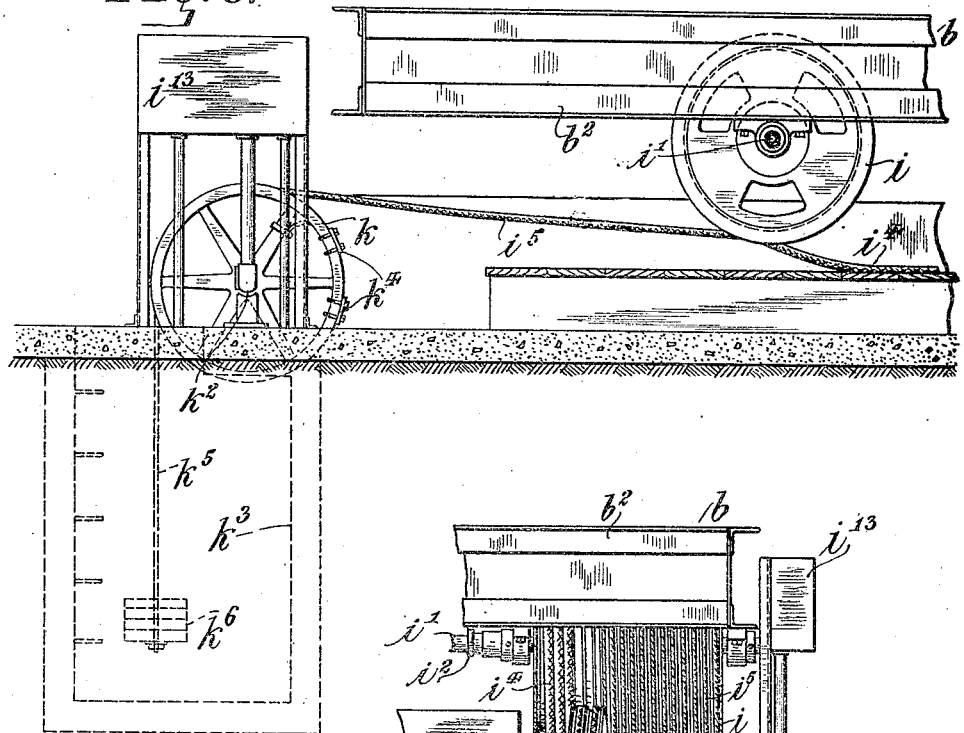
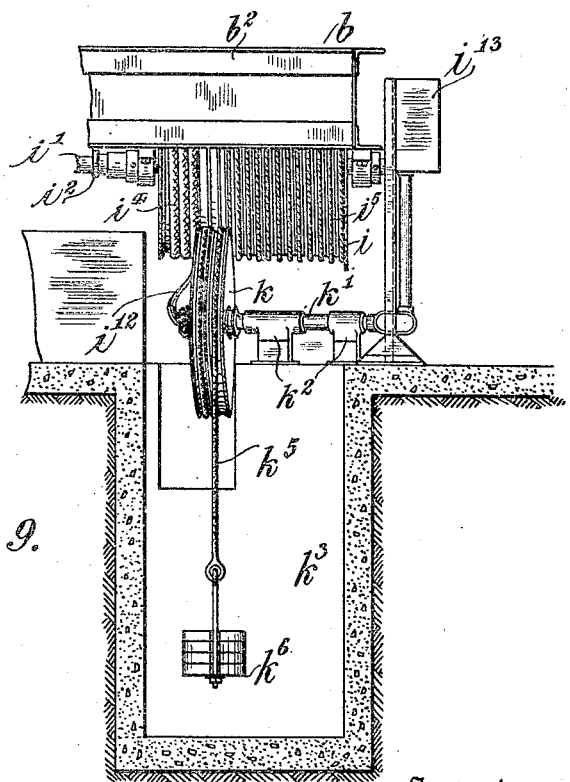

Patented July 6, 1926.

1,591,915

UNITED STATES PATENT OFFICE.

POVL T. LINDHARD, OF BROOKLYN, NEW YORK, ASSIGNOR TO F. L. SMIDTH & CO., OF NEW YORK, N. Y., A CORPORATION OF NEW JERSEY.

APPARATUS FOR AGITATING SLURRY, ETC.

Application filed August 4, 1924. Serial No. 729,944.

In certain industrial processes there are employed, at one stage or another, semi-liquid masses of material which consist of solid particles suspended in liquid and must be agitated constantly in order that the uniformity of the mixture shall be maintained. In the manufacture of Portland cement by the wet process, for example, the slurry, consisting of finely ground Portland cement raw materials and water, must be agitated constantly in order to prevent the solid particles from being precipitated. This agitation is commonly carried on in tanks or vessels of relatively small capacity, either by means of air injected under pressure at the bottom of the mass or by mechanical agitators which consist ordinarily of vertical shafts mounted to rotate in fixed bearings and provided with horizontal arms, or sometimes by a combination of air and a mechanical agitator. The use of air under pressure, either by itself or in conjunction with a mechanical agitator, is not always satisfactory because the air is apt to move, either from fixed nozzles or from nozzles mounted on a mechanical agitator, in lines or paths which are more or less defined and therefore fails to agitate thoroughly the entire mass. The use of mechanical agitators in relatively small tanks involves considerable expense in the construction of many tanks, the equipment of many tanks with the agitating devices, and the consumption of power.

The present invention has for its object to make it possible, with a single apparatus, to agitate thoroughly the large volume of slurry or like semi-liquid material in a single large tank. In accordance with the invention a single set of mechanical agitating devices, the action of which is supplemented if desired by air under pressure, is supported by a carrier which during the operation of the agitating devices is moved to and fro upon an elongated tank, by means which, preferably, are controlled automatically so that the movement of the agitating devices continues as long as may be desired. By such means the entire mass may be agitated sufficiently to prevent precipitation of the solid particles. Details of construction of practical embodiments of the invention will be fully explained hereinafter with reference to the accompanying drawings in which—

Figure 1 is a view in elevation of one form of agitating device embodying the invention in position with respect to a tank which is shown in transverse section.

Figure 1$^a$ is a diagrammatic view of the electrical connections of one of the motors shown in Figure 1.

Figure 2 is a top view of the mechanism shown in Figure 1, with the platform partly broken away to show parts below.

Figure 3 is a detail view of the carrier and its operating means as seen in elevation from the left hand in Figure 2.

Figure 4 is a detail view in longitudinal section and on a larger scale of the drum shown in Figures 1 and 2.

Figure 5 is a view of the drum in end elevation.

Figure 6 is a detail view illustrating the means for maintaining proper tension on the electric cable.

Figure 7 is a top view illustrating a modified form of the means for effecting movement of the carrier.

Figure 8 is a view in end elevation of the parts shown in Figure 7.

Figure 9 is a view of the same parts in elevation as seen from the point of view at right angles to that of Figure 8.

Figure 10 is a sectional detail view, on a larger scale, showing means for securing the cables to the sheave.

In the embodiment of the invention chosen for illustration in Figure 1, with details shown in Figures 2–6, the tank which is to receive the semi-liquid mass and may be of any suitable length, is shown as having side walls $a$, $a$, and a bottom $a'$, with rails $a^2$ extended longitudinally on the side walls $a$, the end walls not being shown.

Resting upon the rails $a^2$, so as to be movable to and fro over the tank, is a carrier $b$, which may comprise girders $b'$, cross girders $b^2$, and a platform or floor $b^3$. The carrier is supported upon the rails $a^2$ by flanged wheels $c$ on shafts $c'$ which may be driven through sprocket chains $c^2$ from a shaft $c^3$ which is mounted in suitable bearings on the carrier and may be driven through a worm gearing indicated at $c^4$ from a motor indicated at $c^5$. It is preferable that the carrier shall be reversed automatically at each end of the tank and for that purpose there may be provided on the carrier two limit switches $d$ of ordinary construction connected to relay operated reversing switches $d'$ for controlling the direction of rotation of the motor $c^5$, so that as the carrier reaches one end or the other of its travel, the corresponding limit switch, by contact with a stop $d^2$, shall be shifted so as to effect reversal of the motor and therefore a reversal of the direction of travel of the carrier.

The motor $c^5$ may be supplied with current by any convenient means from any suitable source, indicated at $d^3$ in Figure 1a.

Suspended from the carrier $b$ is a suitable frame which may comprise vertical members $e$, a bottom member $e'$, and braces $e^2$. Also depending below the carrier there are, in the construction illustrated, two vertical shafts $f$ and $f'$ which carry cross arms $f^2$. In the construction shown the cross arms of the two shafts are in the same plane and the two shafts are therefore rotated in opposite directions with their respective cross arms set at right angles. At the lower end of each shaft, below the frame member $e'$, is a cross arm $f^3$, one part of which is equipped with scrapers $f^4$ suspended from the cross arm so that they just touch the bottom of the tank and agitate the material at the bottom.

As a convenient means for rotating the agitating device each shaft $f$ may have at its upper end, above the platform or floor of the carrier a bevel gear $f^5$ which is engaged by a corresponding bevel pinion $g$ on a shaft $g'$, supported in suitable bearings on the carrier and driven continuously in one direction by a motor $g^2$ through a suitable speed reduction device indicated at $g^3$. Means for delivering air under pressure into the mass of slurry, near the bottom of the tank, are preferably combined with the mechanical agitating devices. In the construction shown an air line $h$, to which air under pressure may be supplied by any convenient means or as hereinafter described, is connected through a branch $h'$ and a suitable stuffing box with an air channel $h^2$ in the upper portion of each shaft $f'$, from which, by a pipe $h^3$ carried down along the shaft $f'$ and outwardly along the arm $f^3$, air is conducted to a nozzle $h^4$ through which air is discharged into the mass of slurry.

Any convenient means may be provided for supplying electric current to the motor $g^2$ and for supplying air under pressure to the air line $h$, but in order that such means may function satisfactorily during the reciprocations of the carriage and the movement of the agitators through the slurry, such means as are shown in Figures 1–6 of the drawings and, in slightly modified form, in Figures 7–10, may be employed. In the construction illustrated in Figures 1–6 the winding drum $i$, preferably formed with a helical groove, is mounted at one end of the carrier on a hollow shaft $i'$, which is supported in suitable bearings. This hollow shaft, which is closed at one end, is connected at the other end, through a stuffing box $i^2$, with the air line $h$ and at a convenient point is provided with a branch $i^3$ which is carried through the shell of the drum and is connected to an air hose $i^4$ which is carried to one end of the tank and is there connected to any convenient source of air under pressure. An electrical cable $i^5$, connected at the opposite end of the tank to a suitable source of supply, is connected to the drum $i$ at the end of the drum opposite to that at which the air hose is connected, and is carried within the drum where the wires of the cable are connected to slip rings $i^6$ from which connection is made, as by wires $i^7$, to the motor $g^2$ in a manner well understood and not requiring detailed explanation. It will be understood that in the travel of the carrier to and fro over the tank the air hose $i^4$ and the electric cable $i^5$ will be wound upon and given off from the drum $i$, the one being wound on the drum as the other is given off. In order that proper tension may be maintained on the hose and cable, it is desirable that a tension device be applied to one or the other. As shown in Figure 6, a weight $i^8$ may be connected by a cord $i^9$, which passes over a sheave $i^{10}$, to a strain insulator $i^{11}$ which is secured to the cable $i^5$. In this manner, during the travel of the carrier and the movement of the agitating devices to and fro through the tank, the electric current is supplied to the motor $g^2$ for operating the mechanical agitators and air under pressure is supplied to the air line and thence to the air nozzles on the agitators.

The construction shown in Figures 7, 8, 9 and 10 is the same as that already described except with respect to the means for maintaining tension on the electric cable $i^5$. In this instance the cable is attached in one groove of a double-grooved sheave $k$ the shaft $k'$ of which is suitably supported in bearings $k^2$ so that the sheave stands over a pit $k^3$. The electric cable is carried along one of the arms of the sheave, as at $i^{12}$, and is then connected through the hollow shaft $k'$ to the switch box $i^{13}$. In the other groove of the sheave $k$ is connected, by suitable clamping devices shown at $k^4$ in Figure 10, a wire cable $k^5$ to which, in the pit $k^3$, is secured a counter-weight $k^6$, whereby proper tension is maintained on the electric cable $i^5$ and, through the drum $i$, on the air hose $i^4$. The tension devices just described as well as the tension device shown in Figure 6, also serve as means to compensate for the different diameters of the air hose and the electric cable. By reason of the difference in diameters a greater or less length of the cable or the hose will be reeled on or off of the drum $i$ in the movement of the carrier and such variation in length will be compensated for by movement up or down of the counterweight $i^8$ or $k^6$ as the case may be.

In operation the carrier is preferably arranged to travel to and fro at a comparatively low speed, as from three feet to five feet per minute, whereas the agitating devices may be rotated at a speed of perhaps five to eight revolutions per minute, so that the agitating devices will make a comparatively large number of revolutions during each movement of the carrier in one direction and thereby the scrapers $f^4$ on the lowermost arms of the agitating devices will sweep every portion of the bottom of the tank during each movement of the carrier and the air nozzles $h^4$ of the two agitating devices will describe continuous interlocking curves causing the air to bubble through the entire body of slurry. The upward movement of the air causes a gradual displacement of the slurry from the bottom to the top and a very intimate mixing of the slurry is effected through the conjoint action of the air and the mechanical agitating devices and the chemical analysis of the slurry becomes uniform and the percentage of water remains the same in all parts of the tank.

It will be understood that various changes in details of construction and arrangement can be made to suit different conditions of use and that, except as pointed out in the claims, the invention is not to be restricted to the particular construction shown and described herein.

I claim as my invention:

1. Apparatus for agitating slurry, etc., in a tank, comprising a carrier adapted to travel to and fro above the tank, an agitating device suspended from the carrier within the tank, means to effect the movement of the carrier, an electric motor and operating connections mounted on the carrier to operate the agitating device, a drum mounted on the carrier, an electric cable having one end connected to a fixed point at one end of the tank and having the other end mechanically connected to the drum and electrically connected to the motor, and a second cable having one end connected to a fixed point at the other end of the tank and its other end mechanically connected to the drum, whereby the electric cable is reeled on and off the drum as the carrier moves to and fro.

2. Apparatus for agitating slurry, etc., in a tank, comprising a carrier adapted to travel to and fro above the tank, an agitating device suspended from the carrier within the tank, means to effect the movement of the carrier, an electric motor and operating connections mounted on the carrier to operate the agitating device, a drum mounted on the carrier, an electric cable having one end connected to a fixed point at one end of the tank and having the other end mechanically connected to the drum and electrically connected to the motor, and a second cable having one end connected to a fixed point at the other end of the tank and its other end mechanically connected to the drum, whereby the electric cable is reeled on and off the drum as the carrier moves to and fro, and means to maintain the electric cable under tension during the movement of the carrier.

3. Apparatus for agitating slurry, etc., in a tank, comprising a carrier adapted to travel to and fro above the tank, an agitating device suspended from the carrier within the tank, means to effect movement of the carrier, an electric motor and operating connections mounted on the carrier to operate the agitating device, a drum mounted on the carrier, an electric cable having one end connected to a fixed point at one end of the tank and having the other end mechanically connected to the drum and electrically connected to the motor, and a second cable having one end connected to a fixed point at the other end of the tank and its other end mechanically connected to the drum, whereby the electric cable is reeled on and off the drum as the carrier moves to and fro, and a counter-balance weight operatively connected to one of the cables to maintain the same under tension during the movement of the carrier.

4. Apparatus for agitating slurry, etc., in a tank, comprising a carrier adapted to travel above the tank, a mechanical agitating device suspended on the carrier within the tank, means to effect the movement of the carrier, means to operate the mechanical agitating device, an air line supported on the carrier, an air nozzle on the agitating device and connected to the air line, and means to supply air under pressure to the air line.

5. Apparatus for agitating slurry, etc., in a tank, comprising a carrier adapted to travel above the tank, a mechanical agitating device suspended on the carrier within the tank, means to effect the movement of the carrier, means to operate the mechanical agitating device, an air line supported on the carrier, an air nozzle on the agitating device and connected to the air line, a drum mounted on the carrier, an air hose having one end connected to a fixed point at one end of the tank and having its other end mechanically connected to the drum, an air connection through the drum from the hose to the air line, and a second cable having one end connected to a fixed point at the other end of the tank and the other end mechanically connected to the drum.

6. Apparatus for agitating slurry, etc., in a tank, comprising a carrier adapted to travel above the tank, a frame extending from the carrier downwardly into the tank toward but not to the bottom thereof, a vertical shaft mounted in bearings in the carrier and in the lower member of the frame, arms carried by the shaft between the carrier and the lower member of the frame, other arms carried by the shaft below the lower member of the frame and immediately above the bottom of the tank in position to agitate the material in contact with the bottom tank, such shaft and arms constituting a mechanical agitating device, means to operate the mechanical agitating device, and means to effect the movement of the carrier.

This specification signed this 1st day of August, A. D. 1924.

POVL T. LINDHARD.